United States Patent
Lin (10) Patent No.: US 9,006,985 B2
(45) Date of Patent: Apr. 14, 2015

(54) LIGHT EMITTING DIODE DRIVING INTEGRATED CIRCUIT WITH A MULTI-STEP CURRENT SETTING FUNCTION AND METHOD OF SETTING A MULTI-STEP CURRENT OF A LIGHT EMITTING DIODE DRIVING INTEGRATED CIRCUIT

(71) Applicant: Leadtrend Technology Corp., Hsin-Chu (TW)

(72) Inventor: Chung-Wei Lin, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 110 days.

(21) Appl. No.: 13/647,384

(22) Filed: Oct. 9, 2012

(65) Prior Publication Data

US 2013/0088158 A1  Apr. 11, 2013

(30) Foreign Application Priority Data

Oct. 11, 2011 (TW) .............................. 100136760 A (51) Int. Cl.
H05B 37/02 (2006.01)
H05B 33/08 (2006.01)

(52) U.S. Cl.
CPC ........ *H05B 33/0812* (2013.01); *H05B 33/0815* (2013.01); *Y02B 20/345* (2013.01)

(58) Field of Classification Search
CPC ...................................................... Y02B 20/345
See application file for complete search history.

(56) References Cited

U.S. PATENT DOCUMENTS

| 6,836,157 | B2 * | 12/2004 | Rader et al. ...................... 327/66 |
| 8,111,017 | B2 * | 2/2012 | Lin et al. ........................ 315/307 |
| 8,248,325 | B2 * | 8/2012 | Danstrom ......................... 345/46 |
| 8,324,816 | B2 * | 12/2012 | Ohashi et al. .................. 315/127 |
| 8,384,311 | B2 * | 2/2013 | Gray et al. ..................... 315/307 |

\* cited by examiner

*Primary Examiner* — Jason M Crawford
*Assistant Examiner* — Nelson Correa
(74) *Attorney, Agent, or Firm* — Winston Hsu; Scott Margo (57) ABSTRACT

A light emitting diode driving integrated circuit with a multi-step current setting function includes a regulator circuit, a variable resistor circuit, and a current generation unit. The regulator circuit provides a supply voltage to a first terminal of at least one series of light emitting diodes to drive the at least one series of light emitting diodes, and regulates a second terminal voltage of the at least one series of light emitting diodes to a target voltage. The variable resistor circuit is used for changing a resistance of the variable resistor circuit in a plurality of steps according to a switching signal. The current generation unit is coupled to the variable resistor circuit for changing current flowing through the at least one series of light emitting diodes in a plurality of steps according to a reference voltage and variation of the resistance of the variable resistor circuit.

11 Claims, 8 Drawing Sheets

LIGHT EMITTING DIODE DRIVING INTEGRATED CIRCUIT WITH A MULTI-STEP CURRENT SETTING FUNCTION AND METHOD OF SETTING A MULTI-STEP CURRENT OF A LIGHT EMITTING DIODE DRIVING INTEGRATED CIRCUIT

BACKGROUND OF THE INVENTION

1. Field of the Invention

The present invention is related to a light emitting diode driving integrated circuit with a multi-step current setting function and a method of setting a multi-step current of a light emitting diode driving integrated circuit, and particularly to a light emitting diode driving integrated circuit with a multi-step current setting function and a method of setting a multi-step current of a light emitting diode driving integrated circuit that can utilize a variable resistor circuit and at least one delay unit to change current flowing through a series of light emitting diodes in a plurality of steps.

2. Description of the Prior Art

In the prior art, after a light emitting diode driving integrated circuit utilizes a reference voltage generation circuit to generate a reference voltage, the reference voltage can control a voltage of one terminal of a series of light emitting diodes to regulate the voltage of the terminal of the series of light emitting diodes to a target voltage (such as 0.6V) through a closed loop formed by a boost controller.

But, the prior art switches a large current mode of the series of light emitting diodes to a small current mode of the series of light emitting diodes in one step. That is to say, a buffer mechanism does not exist between the large current mode and the small current mode of the series of light emitting diodes. Therefore, when the prior art switches the large current mode of the series of light emitting diodes to the small current mode of the series of light emitting diodes, the target voltage is changed violently because variation of current flowing through the series of light emitting diodes is too large. Thus, a protection function of the light emitting diode driving integrated circuit may fail, the driving integrated circuit may be damaged, or other abnormal operation problems may occur due to the violent variation of the target voltage.

SUMMARY OF THE INVENTION

An embodiment provides a light emitting diode driving integrated circuit with a multi-step current setting function. The driving integrated circuit being for driving at least one series of light emitting diodes includes a regulator circuit, a variable resistor circuit, and a current generation unit. The regulator circuit is used for providing a supply voltage to a first terminal of the at least one series of light emitting diodes to drive the at least one series of light emitting diodes, and regulating a voltage of a second terminal of the at least one series of light emitting diodes to a target voltage. The variable resistor circuit is used for changing a resistance of the variable resistor circuit in a plurality of steps according to a switching signal. The current generation unit is coupled to the variable resistor circuit for changing current flowing through the at least one series of light emitting diodes in a plurality of steps according to a reference voltage and variation of the resistance of the variable resistor circuit.

Another embodiment provides a light emitting diode driving integrated circuit with a multi-step current setting function. The driving integrated circuit being for driving at least one series of light emitting diodes includes a regulator circuit and a current generation unit. The regulator circuit is used for providing a supply voltage to a first terminal of the at least one series of light emitting diodes to drive the at least one series of light emitting diodes, and regulating a voltage of a second terminal of the at least one series of light emitting diodes to a target voltage. The current generation unit is uses for changing current flowing through the at least one series of light emitting diodes according to a step reference voltage and a resistor.

Another embodiment provides a method of setting a multi-step current of a light emitting diode driving integrated circuit. The method includes providing a supply voltage to a first terminal of at least one series of light emitting diodes to drive the at least one series of light emitting diodes, and regulating a voltage of a second terminal of the at least one series of light emitting diodes to a target voltage; changing a resistance of the variable resistor circuit in a plurality of steps according to a switching signal; changing current flowing through the at least one series of light emitting diodes in a plurality of steps according to a reference voltage and variation of the resistance of the variable resistor circuit.

Another embodiment provides a method of setting a multi-step current of a light emitting diode driving integrated circuit. The method includes providing a supply voltage to a first terminal of at least one series of light emitting diodes to drive the at least one series of light emitting diodes, and regulating a voltage of a second terminal of the at least one series of light emitting diodes to a target voltage; changing current flowing through the at least one series of light emitting diodes according to a step reference voltage and a resistor.

The present invention provides a light emitting diode driving integrated circuit with a multi-step current setting function and a method of setting a multi-step current of the light emitting diode driving integrated circuit. The light emitting diode driving integrated circuit and the method utilize a variable resistor circuit and at least one delay unit to change a resistance of the variable resistor circuit in a plurality of steps. Then, a current generation unit can change current flowing through a series of light emitting diodes in a plurality of steps according to a reference voltage and variation of the resistance of the variable resistor circuit. In addition, the current generation unit can also change the current flowing through the series of light emitting diodes in a plurality of steps according to a step reference voltage and a fixed resistor. Thus, a voltage of a second terminal of the series of light emitting diodes is changed in a plurality of steps. Therefore, compared to the prior art, the present invention can improve a failed protection function of the driving integrated circuit, damage of the driving integrated circuit, or other abnormal operation problems due to violent variation of the voltage of the second terminal of the series of light emitting diodes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
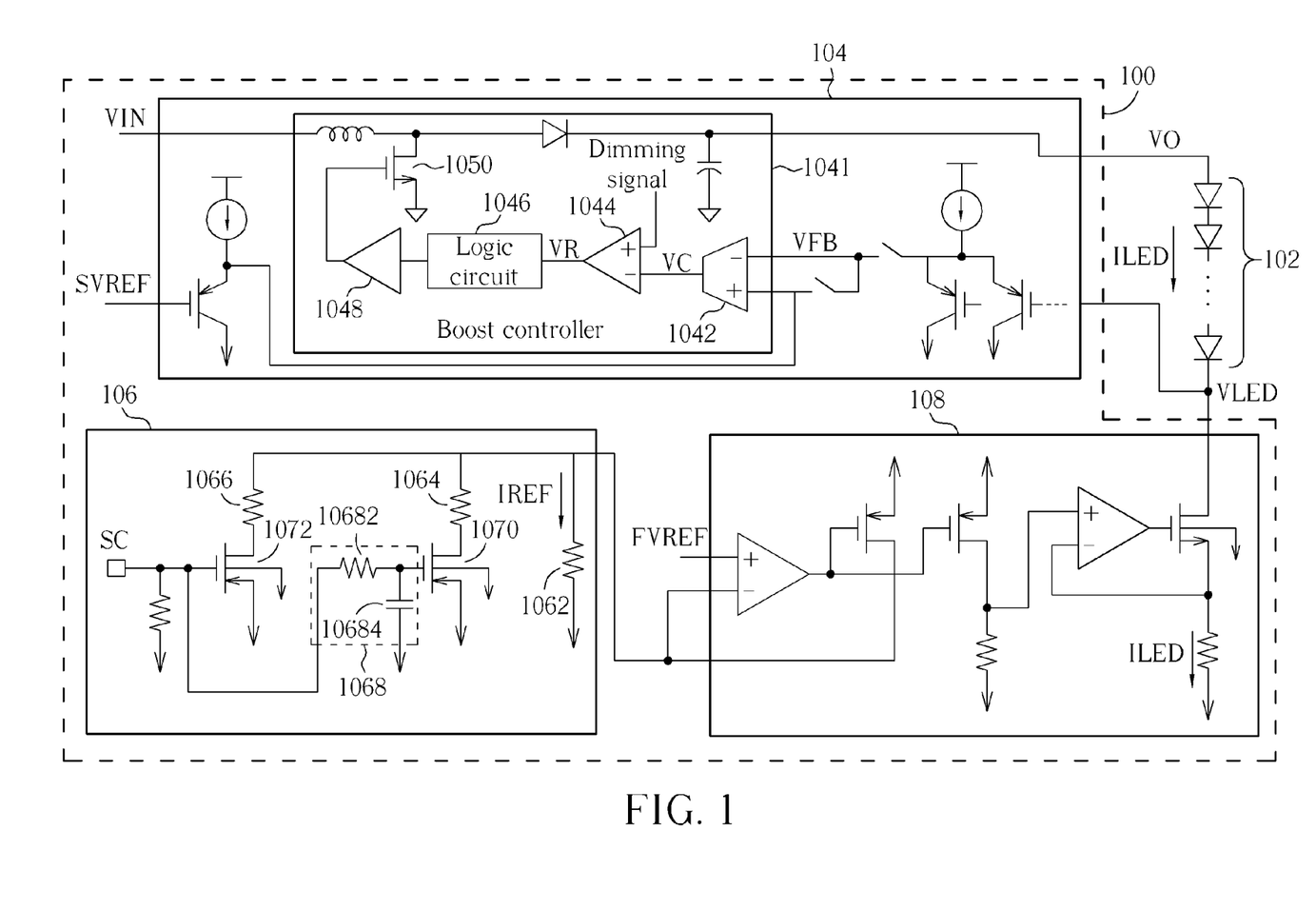
FIG. 1 is a diagram illustrating a light emitting diode driving integrated circuit with a multi-step current setting function 100 according to an embodiment.

Please refer to FIG. 1. FIG. 1 is a diagram illustrating a light emitting diode driving integrated circuit 100 with a multi-step current setting function 100 according to an embodiment. The driving integrated circuit 100 is used for driving a series of light emitting diodes 102. But, the present invention is not limiting to the driving integrated circuit 100 only driving the series of light emitting diodes 102. That is to say, the driving integrated circuit 100 can drive at least one series of light emitting diodes. The driving integrated circuit 100 includes a regulator circuit 104, a variable resistor circuit 106, and a current generation unit 108. The regulator circuit 104 is used for providing a supply voltage VO to a first terminal of the series of light emitting diodes 102 to drive the series of light emitting diodes 102, and regulating a voltage VLED of a second terminal of the series of light emitting diodes 102 to a target voltage (such as 0.6V). The variable resistor circuit 106 is used for changing a resistance of the variable resistor circuit 106 in two steps according to a switching signal SC (such as a switching signal for converting a three-dimensional current mode to a two-dimensional current mode). But, the present invention is not limiting to changing the resistance of the variable resistor circuit 106 in two steps. That is to say, the present invention can change the resistance of the variable resistor circuit 106 in more than two steps. The current generation unit 108 is coupled to the variable resistor circuit 106 for changing current ILED flowing through the series of light emitting diodes 102 in two steps according to a first reference voltage FVREF (such as 1.25V) and variation of the resistance of the variable resistor circuit 106. In the regulator circuit 104, a compensator 1042 of a boost controller 1041 is used for generating a compensation value VC according to a second reference voltage SVREF (corresponding to the voltage VLED of the second terminal of the series of light emitting diodes 102) and a feedback voltage VFB. A comparator 1044 of the boost controller 1041 is used for generating a comparison result VR according to the compensation value VC and a dimming signal. The comparison result VR controls a switch 1050 through a logic circuit 1046 and a gate driving circuit 1048, where VIN is an input voltage. Therefore, the voltage VLED of the second terminal of the series of light emitting diodes 102 can be regulated to the target voltage and the supply voltage VO can be supplied to drive the series of light emitting diodes 102 through the above mentioned loop mechanism.

Figure 2:
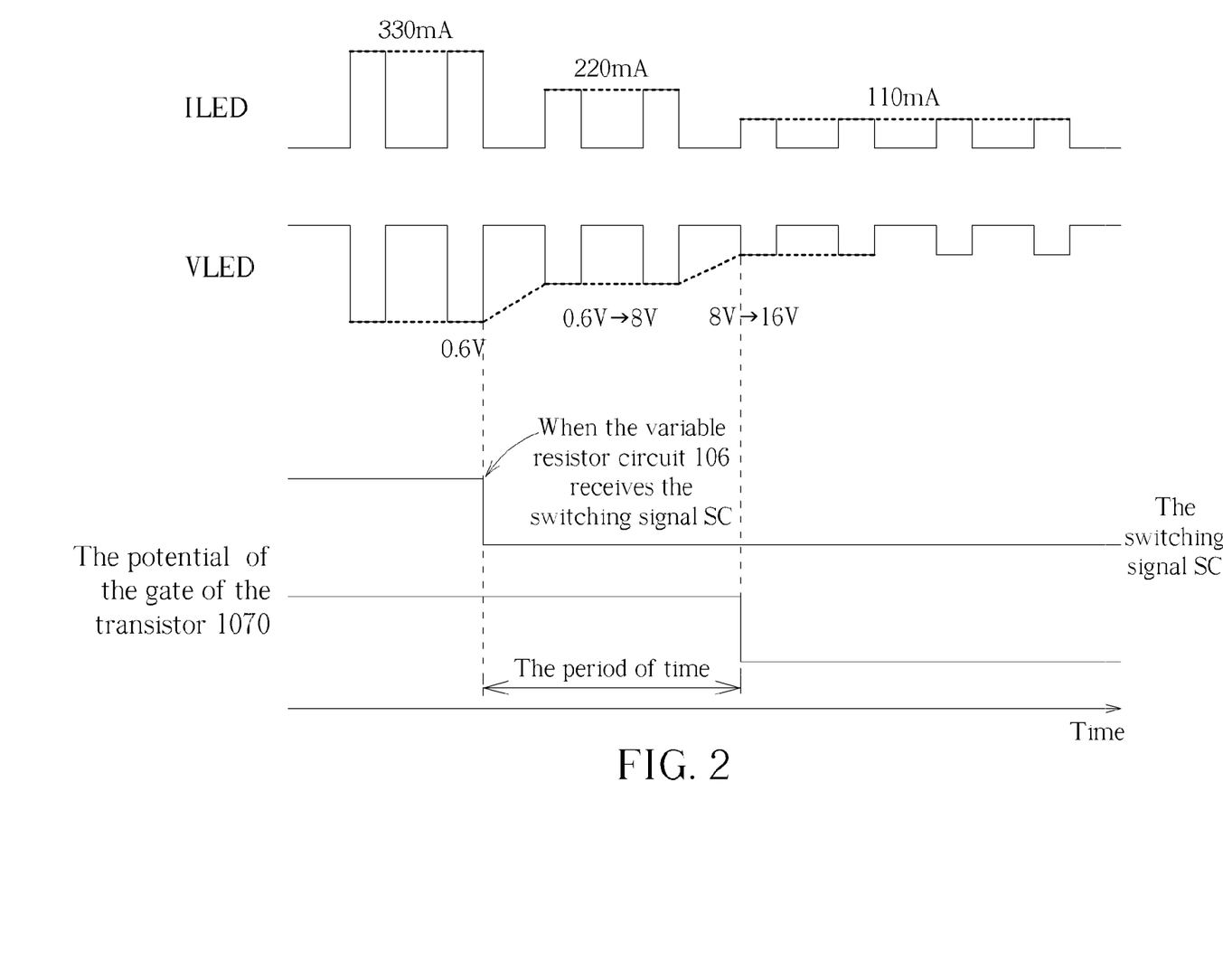
FIG. 2 is a diagram illustrating variation of the current flowing through the series of light emitting diodes.

As shown in FIG. 1, the variable resistor circuit 106 includes three parallel resistors 1062, 1064, and 1066 and a delay unit 1068, where the three parallel resistors 1062, 1064, and 1066 are coupled to the current generation unit 108, and the three parallel resistors 1062, 1064, and 1066 are the same. But, the present invention is not limited to the three parallel resistors 1062, 1064, and 1066 being the same. That is to say, the three parallel resistors 1062, 1064, and 1066 can be different. In addition, the present invention is not limited to the variable resistor circuit 106 only including the three parallel resistors 1062, 1064, and 1066 and the delay unit 1068. That is to say, the variable resistor circuit 106 can include at least three parallel resistors and at least one delay unit. As shown in FIG. 1, the delay unit 1068 includes a resistor 10682 and a capacitor 10684, where the delay unit 1068 delays turning off of a transistor 1070 in series with the parallel resistor 1064 according to a resistor-capacitor time constant of the resistor 10682 and the capacitor 10684. Please refer to FIG. 2. FIG. 2 is a diagram illustrating variation of the current ILED flowing through the series of light emitting diodes 102. When the variable resistor circuit 106 does not receive the switching signal SC, the transistor 1070 and a transistor 1072 in series with the parallel resistors 1064, 1066 are turned on, so the resistance of the variable resistor circuit 106 is minimum (meanwhile, the three parallel resistors 1062, 1064, 1066 are parallel). Because reference current IREF of the current generation unit 108 is generated according to the second reference voltage SVREF and the resistance of the variable resistor circuit 106, the reference current IREF is maximum when the transistors 1070, 1072 in series with the parallel resistors 1064, 1066 are turned on, resulting in current ILED flowing through the series of light emitting diodes 102 generated by the current generation unit 108 according to the reference current IREF being also maximum (such as 330 mA). As shown in FIG. 2, when the variable resistor circuit 106 receives the switching signal SC, the transistor 1070 in series with the parallel resistor 1064 is turned on and the transistor 1072 coupled to the parallel resistor 1066 is turned off, resulting in the resistance of the variable resistor circuit 106 being increased (meanwhile, the parallel resistors 1062, 1064 are parallel). Therefore, the reference current IREF is reduced, resulting in the current ILED flowing through the series of light emitting diodes 102 being also reduced (such as 220 mA). Because the current ILED flowing through the series of light emitting diodes 102 is reduced (that is, a voltage drop of the series of light emitting diodes 102 is reduced), the voltage VLED of the second terminal of the series of light emitting diodes 102 is changed from 0.6V to 8V instantaneously. In addition, as shown in FIG. 2, after the switching signal SC is delayed for a period of time through the delay unit 1068, the switching signal SC turns off the transistor 1070 in series with the parallel resistor 1064, so the resistance of the variable resistor circuit 106 is maximum (that is, the resistance of the variable resistor circuit 106 is equal to the parallel resistor 1062). Therefore, the reference current IREF is reduced to minimum, resulting in the current ILED flowing through the series of light emitting diodes 102 being also minimum (such as 110 mA). Because the current ILED flowing through the series of light emitting diodes 102 is reduced again (that is, the voltage drop of the series of light emitting diodes 102 is reduced again), the voltage VLED of the second terminal of the series of light emitting diodes 102 is changed from 8V to 16V instantaneously. As shown in FIG. 2, because the current generation unit 108 changes the current ILED flowing through the series of light emitting diodes 102 in two steps, the voltage VLED of the second terminal of the series of light emitting diodes 102 is also changed from 0.6V to 16V in two steps. In addition, the transistors 1070, 1072 can be N-type metal-oxide-semiconductor transistors or P-type metal-oxide-semiconductor transistors.

Figure 3:
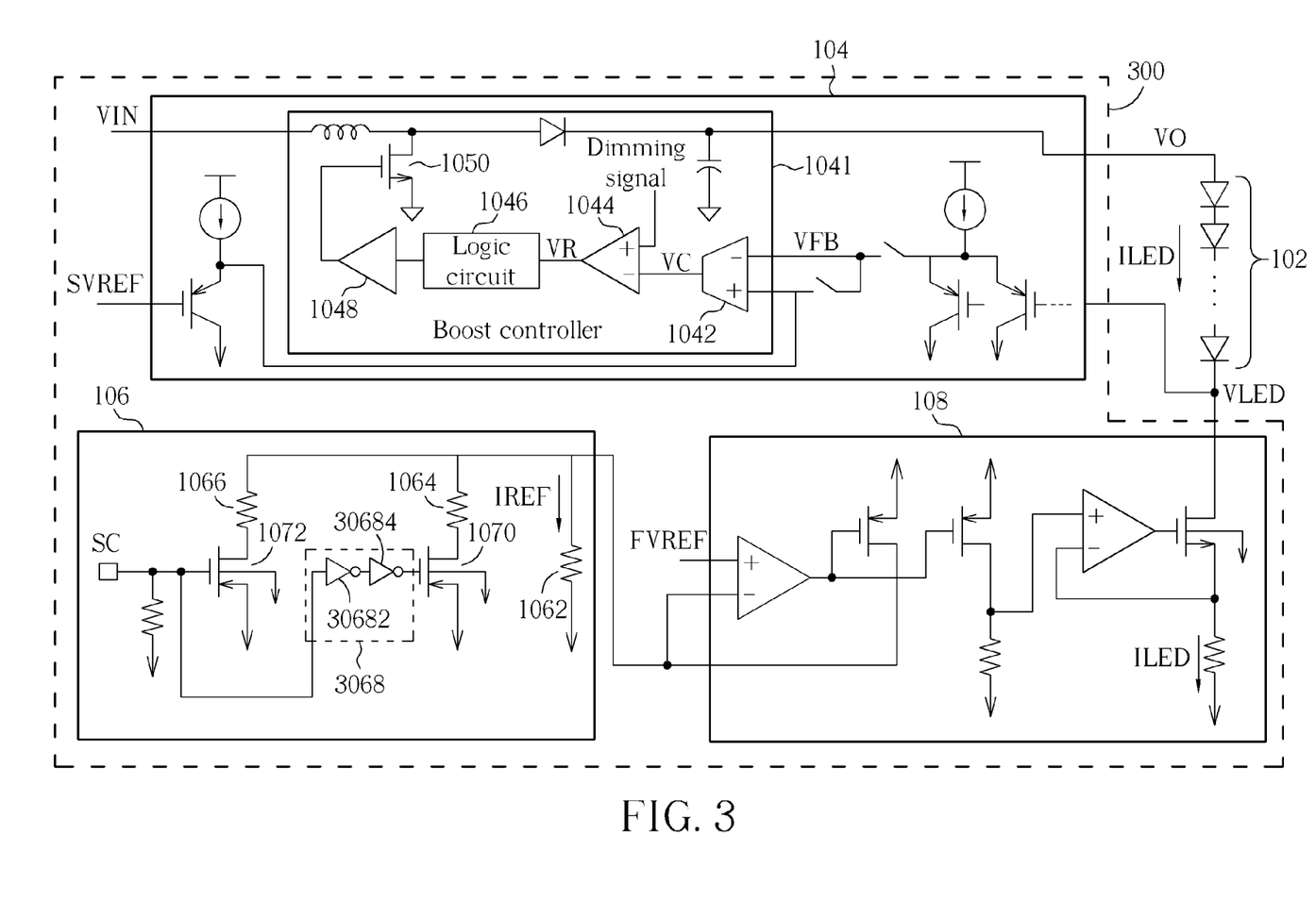
FIG. 3 is a diagram illustrating a light emitting diode driving integrated circuit with a multi-step current setting function according to another embodiment.

Please refer to FIG. 3. FIG. 3 is a diagram illustrating a light emitting diode driving integrated circuit 300 with a multi-step current setting function according to another embodiment. A difference between the driving integrated circuit 300 and the driving integrated circuit 100 is that a delay unit 3068 includes a first inverter 30682 and a second inverter 30684. The delay unit 3068 delays turning off of the transistor 1070 in series with the parallel resistor 1064 according to time for a switching signal SC to pass the first inverter 30682 and the second inverter 30684. Further, subsequent operational principles of the driving integrated circuit 300 are the same as those of the driving integrated circuit 100, so further description thereof is omitted for simplicity.

Figure 4:
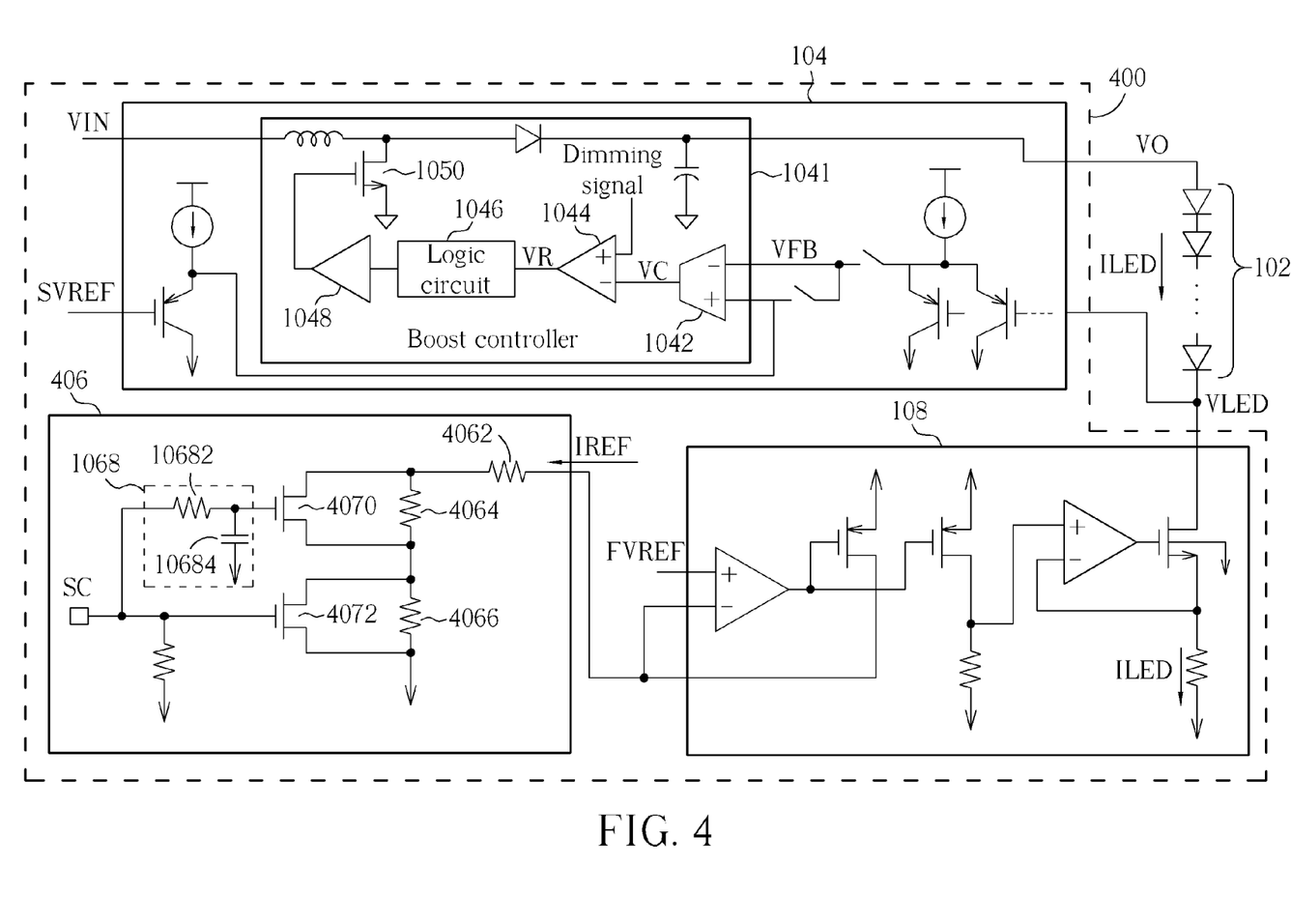
FIG. 4 is a diagram illustrating a light emitting diode driving integrated circuit with a multi-step current setting function according to another embodiment.

Please refer to FIG. 4. FIG. 4 is a diagram illustrating a light emitting diode driving integrated circuit 400 with a multi-step current setting function according to another embodiment. A difference between the driving integrated circuit 400 and the driving integrated circuit 100 is that a variable resistor circuit 406 includes three series resistors 4062, 4064, and 4066 and the delay unit 1068, where the three series resistors 4062, 4064, and 4066 are coupled to the current generation unit 108, and the three series resistors 4062, 4064, and 4066 are the same. But, the present invention is not limited to the three series resistors 4062, 4064, and 4066 being the same. That is to say, the three series resistors 4062, 4064, and 4066 can be different. In addition, the present invention is not limited to the variable resistor circuit 406 only including the three series resistors 4062, 4064, and 4066 and the delay unit 1068. That is to say, the variable resistor circuit 406 can include at least three series resistors and at least one delay unit. When the variable resistor circuit 406 does not receive the switching signal SC, transistors 4070, 4072 in parallel with the series resistors 4064, 4066 are turned on, so a resistance of the variable resistor circuit 406 is minimum (that is, the resistance of the variable resistor circuit 406 is equal to the series resistor 4062). Because reference current IREF of the current generation unit 108 is generated according to the second reference voltage SVREF and the resistance of the variable resistor circuit 406, the reference current IREF is maximum when the transistors 4070, 4072 in parallel with the series resistors 4064, 4066 are turned on, resulting in current ILED flowing through the series of light emitting diodes 102 generated by the current generation unit 108 according to the reference current IREF being also maximum (such as 330 mA). As shown in FIG. 4, when the variable resistor circuit 406 receives the switching signal SC, the transistor 4070 in parallel with the series resistor 4064 is turned on and the transistor 4072 in parallel with the series resistor 4066 is turned off, resulting in the resistance of the variable resistor circuit 406 being increased (meanwhile, the series resistor 4062 is in series with the series resistor 4066). Therefore, the reference current IREF is reduced, resulting in the current ILED flowing through the series of light emitting diodes 102 being also reduced (such as 220 mA). Because the current ILED flowing through the series of light emitting diodes 102 is reduced (that is, a voltage drop of the series of light emitting diodes 102 is reduced), a voltage VLED of the second terminal of the series of light emitting diodes 102 is changed from 0.6V to 8V instantaneously. In addition, as shown in FIG. 4, after the switching signal SC is delayed for a period of time through the delay unit 1068, the switching signal SC turns off the transistor 4070 in parallel with the series resistor 4064, so the resistance of the variable resistor circuit 406 is maximum (that is, the three series resistors 4062, 4064, and 4066 are in series). Therefore, the reference current IREF is reduced to minimum, resulting in the current ILED flowing through the series of light emitting diodes 102 being also minimum (such as 110 mA). Because the current ILED flowing through the series of light emitting diodes 102 is reduced again (that is, the voltage drop of the series of light emitting diodes 102 is reduced again), the voltage VLED of the second terminal of the series of light emitting diodes 102 is changed from 8V to 16V instantaneously. As shown in FIG. 4, because the current generation unit 108 changes the current ILED flowing through the series of light emitting diodes 102 in two steps, the voltage VLED of the second terminal of the series of light emitting diodes 102 is also changed from 0.6V to 16V in two steps. In addition, the transistors 4070, 4072 can be N-type metal-oxide-semiconductor transistors or P-type metal-oxide-semiconductor transistors. Further, subsequent operational principles of the driving integrated circuit 400 are the same as those of the driving integrated circuit 100, so further description thereof is omitted for simplicity.

Figure 5:
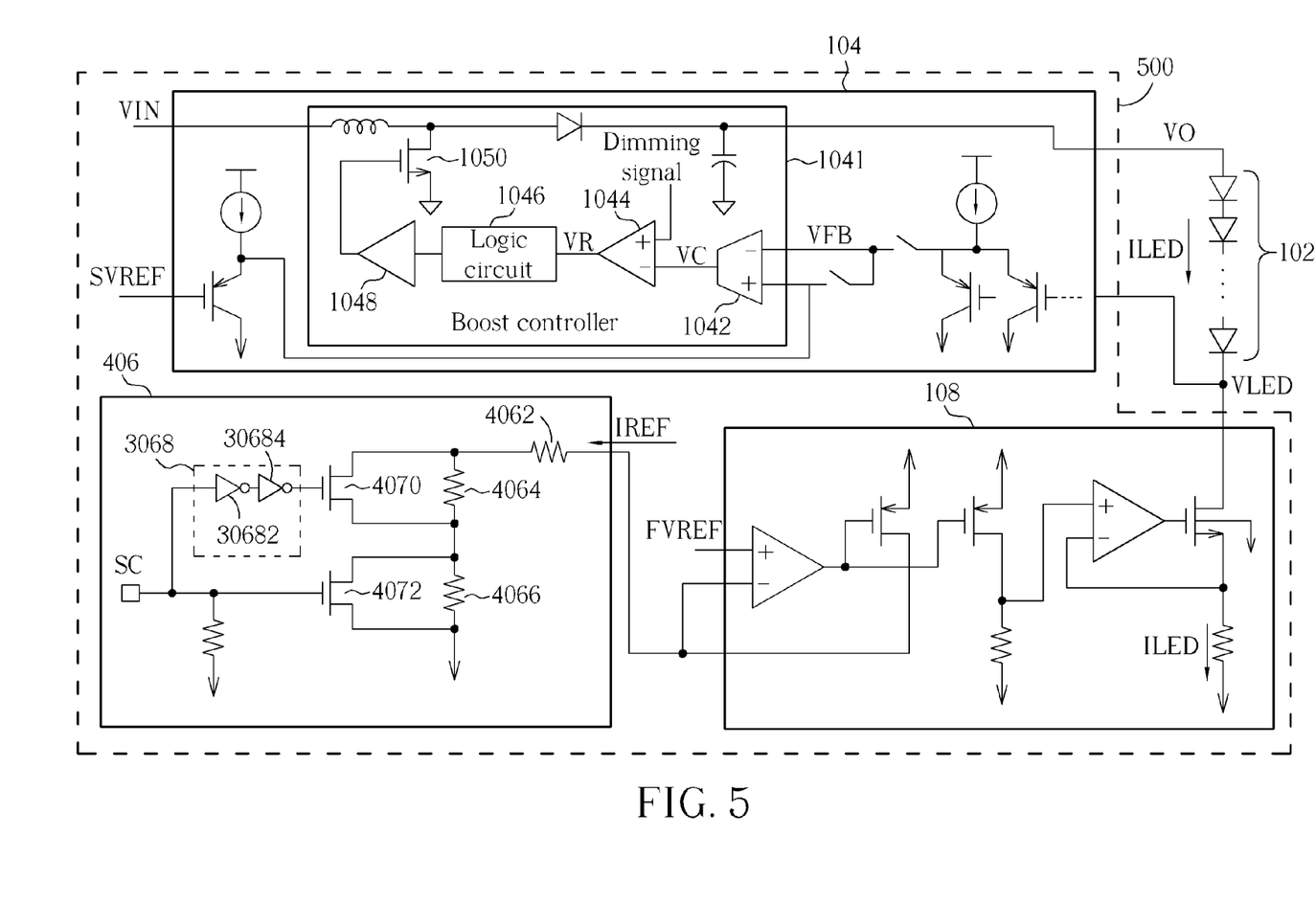
FIG. 5 is a diagram illustrating a light emitting diode driving integrated circuit with a multi-step current setting function according to another embodiment.

Please refer to FIG. 5. FIG. 5 is a diagram illustrating a light emitting diode driving integrated circuit 500 with a multi-step current setting function according to another embodiment. A difference between the driving integrated circuit 500 and the driving integrated circuit 400 is that driving integrated circuit 500 utilizes the delay unit 3068 to replace the delay unit 1068. Further, subsequent operational principles of the driving integrated circuit 500 are the same as those of the driving integrated circuit 400, so further description thereof is omitted for simplicity.

Figure 6:
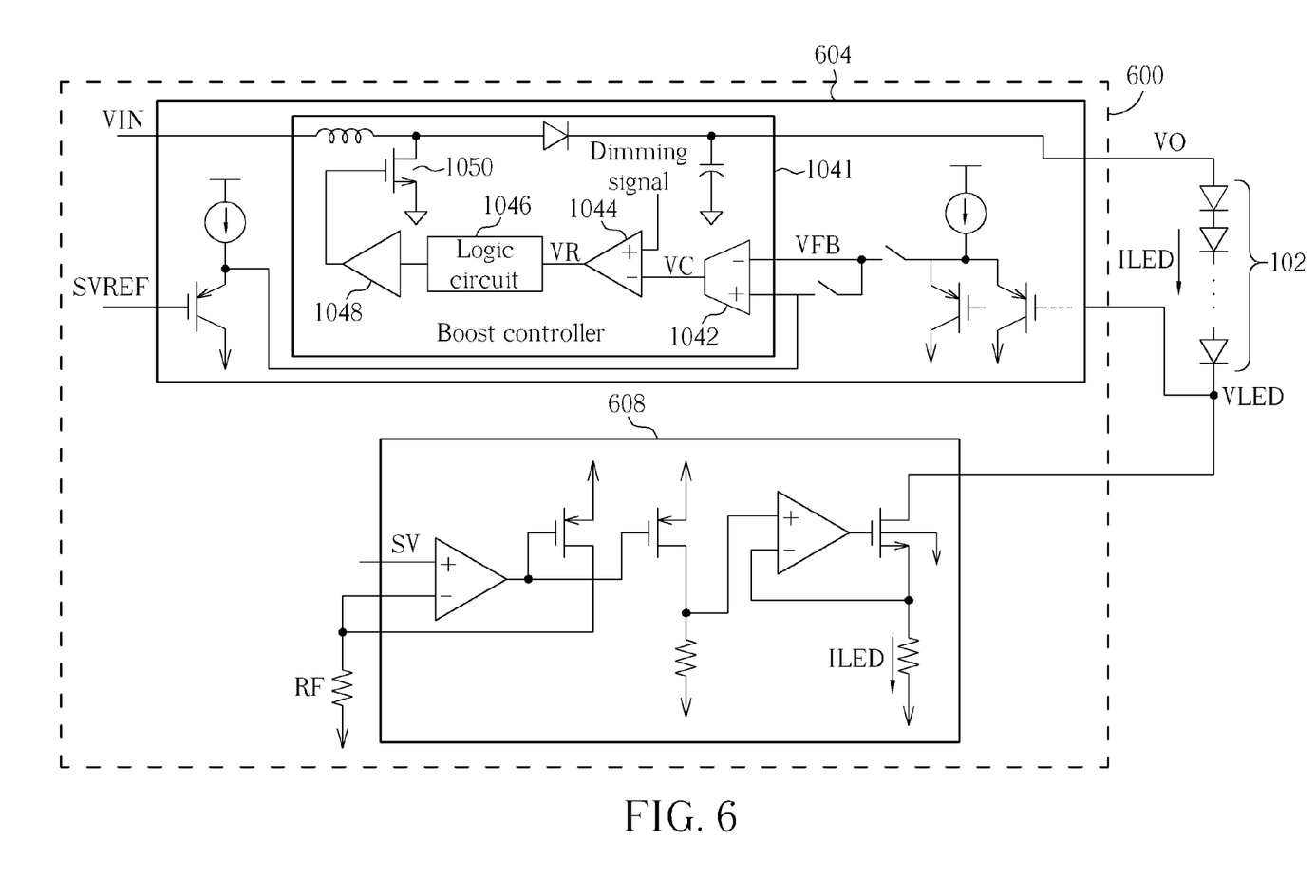
FIG. 6 is a diagram illustrating a light emitting diode driving integrated circuit with a multi-step current setting function according to another embodiment.

Please refer to FIG. 6. FIG. 6 is a diagram illustrating a light emitting diode driving integrated circuit 600 with a multi-step current setting function according to another embodiment. A driving integrated circuit 600 includes a regulator circuit 604 and a current generation unit 608, where the regulator circuit 604 is the same as the regulator circuit 104, so further description thereof is omitted for simplicity. A difference between the driving integrated circuit 600 and the driving integrated circuit 100 is that the driving integrated circuit 600 utilizes a fixed resistor RF to replace the variable resistor circuit 106, and the current generation unit 608 changes current ILED flowing through the series of light emitting diodes 102 according to a step reference voltage SV and the fixed resistor RF. That is to say, because the step reference voltage SV is reduced from a high voltage to a low voltage in two steps, current ILED flowing through a series of light emitting diodes is also reduced from large current (330 mA) to small current (110 mA) in two steps. Further, subsequent operational principles of the driving integrated circuit 600 are the same as those of the driving integrated circuit 100, so further description thereof is omitted for simplicity.

Figure 7:
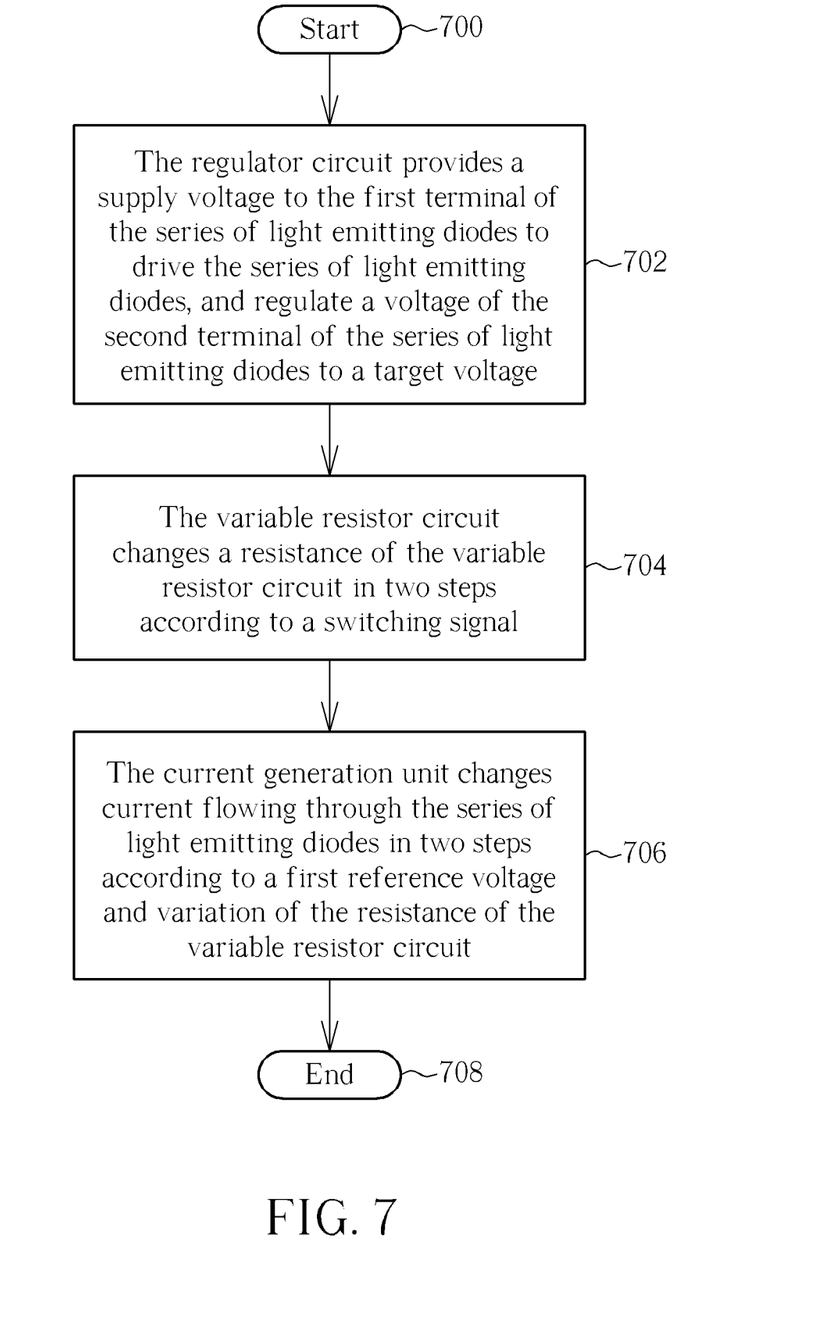
FIG. 7 is flowchart illustrating a method of setting a multi-step current of a light emitting diode driving integrated circuit according to another embodiment.

Please refer to FIG. 7. FIG. 7 is flowchart illustrating a method of setting a multi-step current of a light emitting diode driving integrated circuit according to another embodiment. The method in FIG. 7 is illustrated using the driving integrated circuit 100 in FIG. 1. Detailed steps are as follows:

Step 700: Start.

Step 702: The regulator circuit 104 provides a supply voltage VO to the first terminal of the series of light emitting diodes 102 to drive the series of light emitting diodes 102, and regulate a voltage of the second terminal of the series of light emitting diodes 102 to a target voltage VLED.

Step 704: The variable resistor circuit 106 changes a resistance of the variable resistor circuit 106 in two steps according to a switching signal SC.

Step 706: The current generation unit 108 changes current ILED flowing through the series of light emitting diodes 102 in two steps according to a first reference voltage FVREF and variation of the resistance of the variable resistor circuit 106.

Step 708: End.

In Step 704, the variable resistor circuit 106 includes the three parallel resistors 1062, 1064, and 1066. When the variable resistor circuit 106 receives the switching signal SC, the variable resistor circuit 106 delays turning off of the transistor 1070 in series with the parallel resistor 1064 through the delay unit 1068 and the switching signal SC. That is to say, the resistance of the variable resistor circuit 106 is changed from a large resistance to a small resistance in two steps. In addition, in another embodiment of the present invention, the variable resistor circuit 106 substitutes the delay unit 3068 for the delay unit 1068. In addition, in another embodiment of the present invention, the variable resistor circuit 406 includes the three series resistors 4062, 4064, and 4066. Therefore, when the variable resistor circuit 406 receives the switching signal SC, the variable resistor circuit 406 delays turning off of the transistor 4070 in parallel with the series resistor 4064 through the delay unit 1068 and the switching signal SC. That is to say, the resistance of the variable resistor circuit 406 is changed from a small resistance to a large resistance in two steps. In addition, in another embodiment of the present invention, the variable resistor circuit 406 substitutes the delay unit 3068 for the delay unit 1068. In Step 706, as shown in FIG. 2, the current generation unit 108 changes the current ILED flowing through the series of light emitting diodes 102 in two steps according to the first reference voltage FVREF and the variation of the resistance of the variable resistor circuit 106. That is to say, the current ILED flowing through the series of light emitting diodes 102 is changed from 330 mA to 220 mA, and then changed from 220 mA to 110 mA. Thus, the voltage of the second terminal of the series of light emitting diodes 102 is first changed form 0.6V to 8V, and then changed from 8V to 16V.

Figure 8:
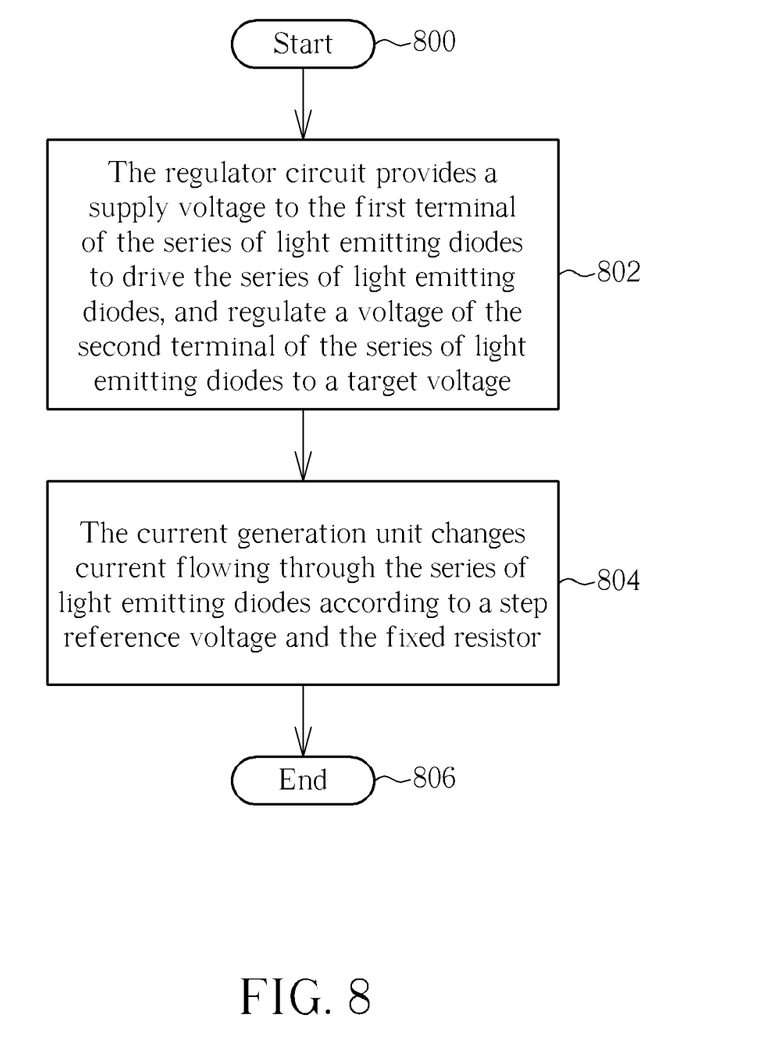
FIG. 8 is flowchart illustrating a method of setting a multi-step current of a light emitting diode driving integrated circuit according to another embodiment.

Please refer to FIG. 8. FIG. 8 is flowchart illustrating a method of setting a multi-step current of a light emitting diode driving integrated circuit according to another embodiment. The method in FIG. 8 is illustrated using the driving integrated circuit 600 in FIG. 6. Detailed steps are as follows:

Step 800: Start.

Step 802: The regulator circuit 604 provides a supply voltage VO to the first terminal of the series of light emitting diodes 102 to drive the series of light emitting diodes 102, and regulate a voltage of the second terminal of the series of light emitting diodes 102 to a target voltage VLED.

Step 804: The current generation unit 608 changes current ILED flowing through the series of light emitting diodes 102 according to a step reference voltage SV and the fixed resistor RF.

Step 806: End.

A difference between the embodiment in FIG. 8 and the embodiment in FIG. 7 is that the driving integrated circuit 600 substitutes the fixed resistor RF for the variable resistor circuit 106, and the current generation unit 608 changes the current ILED flowing through the series of light emitting diodes 102 according to the step reference voltage SV and the fixed resistor RF. That is to say, because the step reference voltage SV is reduced from a high voltage to a low voltage in two steps, the current ILED flowing through a series of light emitting diodes is also reduced from large current (330 mA) to small current (110 mA). Further, subsequent operational principles of the embodiment in FIG. 8 are the same as those of the embodiment in FIG. 7, so further description thereof is omitted for simplicity.

To sum up, the light emitting diode driving integrated circuit with the multi-step current setting function and the method of setting the multi-step current of the light emitting diode driving integrated circuit utilize the variable resistor circuit and the delay unit to change a resistance of the variable resistor circuit in a plurality of steps. Then, the current generation unit can change current flowing through a series of light emitting diodes in a plurality of steps according to the reference voltage and variation of the resistance of the variable resistor circuit. In addition, the current generation unit can also change the current flowing through the series of light emitting diodes in a plurality of steps according to a step reference voltage and a fixed resistor. Thus, a voltage of a second terminal of the series of light emitting diodes is changed in a plurality of steps. Therefore, compared to the prior art, the present invention can improve a failed protection function of the driving integrated circuit, damage of the driving integrated circuit, or other abnormal operation problems due to violent variation of the voltage of the second terminal of the series of light emitting diodes (from 0.6V to 16V).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light emitting diode driving integrated circuit with a multi-step current setting function, the light emitting diode driving integrated circuit being for driving at least one series of light emitting diodes comprising:
    a regulator circuit for providing a supply voltage to a first terminal of the at least one series of light emitting diodes to drive the at least one series of light emitting diodes, and regulating a voltage of a second terminal of the at least one series of light emitting diodes to a target voltage;
    a variable resistor circuit, wherein a resistance of the variable resistor circuit is changed in a plurality of steps according to a switching signal and a resistor-capacitor time constant when the variable resistor circuit receives the switching signal, and the switching signal is a direct current (DC) voltage signal, wherein the variable resistor circuit comprises:
        at least three parallel resistors; and
        at least one delay unit having the resistor-capacitor time constant, wherein the at least one delay unit is used for delaying turning-off of a transistor in series with at least one parallel resistor of the at least three parallel resistors to change the resistance of the variable resistor circuit according to the switching signal and the resistor-capacitor time constant when the variable resistor circuit receives the switching signal; and
    a current generation unit coupled to the at least three parallel resistors of the variable resistor circuit for changing current flowing through the at least one series of light emitting diodes in a plurality of steps according to a reference voltage and variation of the resistance of the variable resistor circuit.

2. The driving integrated circuit of claim 1, wherein each delay unit comprises:
    a resistor; and
    a capacitor coupled to one terminal of the resistor.

3. The driving integrated circuit of claim 1, wherein each delay unit comprises:
    a first inverter; and
    a second inverter in series with the first inverter, wherein the delay unit delays turning off of the transistor in series with the at least one parallel resistor of the at least three parallel resistors according to time for the switching signal passing the first inverter and the second inverter.

4. The driving integrated circuit of claim 1, wherein the transistor is an N-type metal-oxide-semiconductor transistor.

5. The driving integrated circuit of claim 1, wherein the transistor is a P-type metal-oxide-semiconductor transistor.

6. A method of setting a multi-step current of a light emitting diode driving integrated circuit, the method comprising:
providing a supply voltage to a first terminal of at least one series of light emitting diodes to drive the at least one series of light emitting diodes, and regulating a voltage of a second terminal of the at least one series of light emitting diodes to a target voltage;
changing a resistance of a variable resistor circuit by delaying turning-off of a transistor in parallel with at least one series resistor of at least three series resistors of the variable resistor circuit in a plurality of steps according to a switching signal and a resistor-capacitor time constant, wherein the switching signal is a DC voltage signal; and
changing current flowing through the at least one series of light emitting diodes in a plurality of steps according to a reference voltage and variation of the resistance of the variable resistor circuit.

7. A light emitting diode driving integrated circuit with a multi-step current setting function, the light emitting diode driving integrated circuit being for driving at least one series of light emitting diodes comprising:
a regulator circuit for providing a supply voltage to a first terminal of the at least one series of light emitting diodes to drive the at least one series of light emitting diodes, and regulating a voltage of a second terminal of the at least one series of light emitting diodes to a target voltage;
a variable resistor circuit, wherein a resistance of the variable resistor circuit is changed in a plurality of steps according to a switching signal and a resistor-capacitor time constant when the variable resistor circuit receives the switching signal, and the switching signal is a DC voltage signal, wherein the variable resistor circuit comprises:
at least three series resistors coupled to the current generation unit; and
at least one delay unit having the resistor-capacitor time constant, wherein the at least one delay unit is used for delaying turning-off of a transistor in parallel with at least one series resistor of the at least three series resistors to change the resistance of the variable resistor circuit according to the switching signal and the resistor-capacitor time constant when the variable resistor circuit receives the switching signal; and
a current generation unit coupled to the at least three parallel resistors of the variable resistor circuit for changing current flowing through the at least one series of light emitting diodes in a plurality of steps according to a reference voltage and variation of the resistance of the variable resistor circuit.

8. The driving integrated circuit of claim 7, wherein each delay unit comprises:
a resistor; and
a capacitor coupled to one terminal of the resistor, wherein the delay unit delays turning off of a transistor in parallel with at least one series resistor of the at least three series resistors according to a resistance capacitance time constant of the resistor and the capacitor.

9. The driving integrated circuit of claim 7, wherein each delay unit comprises:
a first inverter; and
a second inverter in series with the first inverter, wherein the delay unit delays turning off of a transistor in parallel with at least one series resistor of the at least three series resistors according to time for the switching signal to pass the first inverter and the second inverter.

10. The driving integrated circuit of claim 7, wherein transistor is an N-type metal-oxide-semiconductor transistor.

11. The driving integrated circuit of claim 7, wherein transistor is a P-type metal-oxide-semiconductor transistor.

* * * * *